US009703087B2

(12) United States Patent
Cho et al.

(10) Patent No.: US 9,703,087 B2
(45) Date of Patent: Jul. 11, 2017

(54) FLUORESCENCE MODULE WITH A PLURALITY OF FILTERS AND LIGHT SOURCES

(71) Applicant: Echo Laboratories, Inc., San Diego, CA (US)

(72) Inventors: Eugene L. Cho, San Diego, CA (US); Derek Fuller, San Diego, CA (US); Dorian Raymer, San Diego, CA (US); Anthony Beatty, San Diego, CA (US); Adam Rusch, San Diego, CA (US); Giacomo Strollo, San Diego, CA (US)

(73) Assignee: Echo Laboratories, Inc., San Diego, CA (US)

( * ) Notice: Subject to any disclaimer, the term of this patent is extended or adjusted under 35 U.S.C. 154(b) by 0 days.

(21) Appl. No.: 15/046,282

(22) Filed: Feb. 17, 2016

(65) Prior Publication Data

US 2016/0238829 A1    Aug. 18, 2016

Related U.S. Application Data

(60) Provisional application No. 62/117,379, filed on Feb. 17, 2015.

(51) Int. Cl.
| | |
|---|---|
| *G02B 21/06* | (2006.01) |
| *G02B 21/36* | (2006.01) |
| *G02B 21/16* | (2006.01) |
| *G02B 7/00* | (2006.01) |
| *G02B 7/16* | (2006.01) |
| *G02B 21/08* | (2006.01) |
| *G02B 26/00* | (2006.01) |
| *G02B 21/00* | (2006.01) |

(52) U.S. Cl.
CPC ........... *G02B 21/361* (2013.01); *G02B 7/006* (2013.01); *G02B 7/16* (2013.01); *G02B 21/06* (2013.01); *G02B 21/082* (2013.01); *G02B 21/16* (2013.01); *G02B 26/007* (2013.01); *G02B 21/0076* (2013.01)

(58) Field of Classification Search
CPC  G02B 21/00; G02B 21/0004; G02B 21/0088; G02B 21/06; G02B 21/08; G02B 21/082; G02B 21/086; G02B 21/088; G02B 21/24; G02B 21/248; G02B 21/0076
USPC ....... 359/362, 363, 368, 369, 384, 385, 388, 359/390
See application file for complete search history.

(56) References Cited

U.S. PATENT DOCUMENTS

| | | | | |
|---|---|---|---|---|
| 6,437,913 B1 * | 8/2002 | Kishi | ................ | G02B 21/0056 359/363 |
| 6,636,353 B2 * | 10/2003 | Yamaguchi | .......... | G02B 21/248 359/368 |
| 7,852,553 B2 * | 12/2010 | Tsutsui | ................ | G02B 6/4206 359/385 |
| 2006/0012860 A1 * | 1/2006 | Bender | ................ | G02B 21/00 359/381 |

(Continued)

*Primary Examiner* — Arnel C Lavarias
(74) *Attorney, Agent, or Firm* — Polsinelli PC

(57) ABSTRACT

Aspects of the subject technology provide a fluorescence module that is configured to provide a selectable light source for fluorescence microscopy, e.g., through independent paired selection of a light source (emitter) and a corresponding light filter. In some implementations, light source and/or light filter selection is controlled through the independent actuation of light sources and/or light filters on a supporting turret structure.

10 Claims, 10 Drawing Sheets

(56) References Cited

U.S. PATENT DOCUMENTS

2011/0019272 A1* 1/2011 Dietzsch ............... G02B 21/06
359/388

* cited by examiner

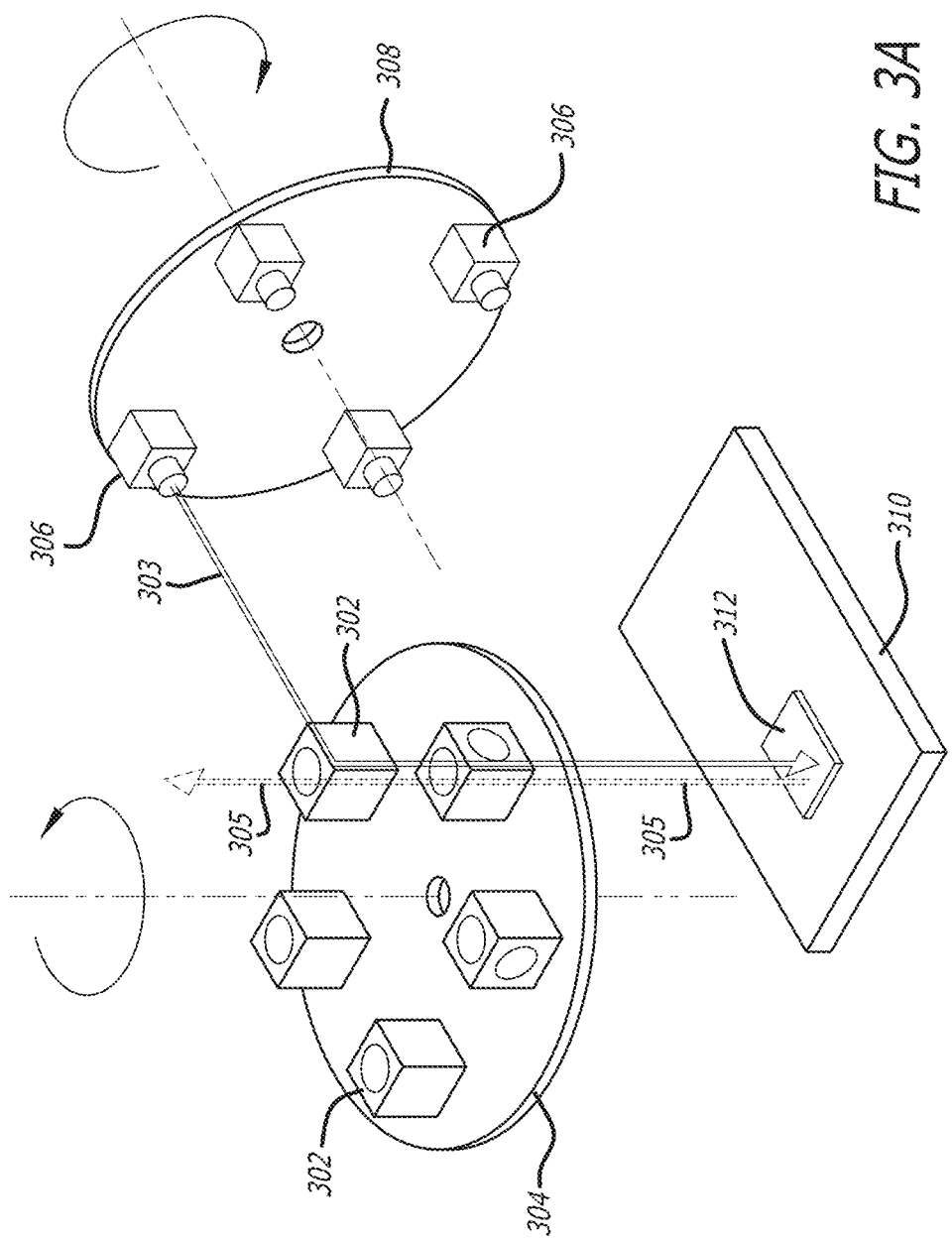

FLUORESCENCE MODULE WITH A PLURALITY OF FILTERS AND LIGHT SOURCES

CROSS-REFERENCE TO RELATED APPLICATIONS

This application claims the benefit of U.S. Provisional Application No. 62/117,379 filed Feb. 17, 2015, entitled "FLUORESCENCE MODULE," which is incorporated herein by reference in its entirety.

TECHNICAL FIELD

The systems and methods disclosed herein relate generally to a microscope fluorescence module, and more particularly to a fluorescence module configured for use with a reconfigurable microscope.

INTRODUCTION

Conventionally, there are two types of microscope configurations, upright and inverted. Upright and inverted microscopes differ in the manner by which a specimen and an objective are respectively arranged. For example, in an upright microscope, the objective is arranged so that it is disposed above the specimen. In an inverted microscope, the objective is disposed below the specimen. Accordingly, an optic train, (i.e., the arrangement of lenses within a housing) that is used for image formation (of the specimen), is arranged either above or below the specimen along with the objective.

A microscope with a fluorescence module may be used to study properties of organic or inorganic substances using fluorescence instead of, or in addition to, reflection and absorption. Fluorescence is based on the phenomenon that certain material emits energy detectable as visible light when irradiated with the light of a specific wavelength. A specimen can either be fluorescing in its natural form (like chlorophyll) or it may be treated with a fluorescing stain. A fluorescence microscope typically includes a light source and several filters that correspond to a wavelength matching the fluorescence stain. Specifically, an excitation filter is provided for selecting an excitation wavelength of light from the light source, and a dichroic beam splitter is used to reflect light from the light source to illuminate the specimen. The illuminated light is separated from the much weaker emitted fluorescence with an emission filter. The fluorescing areas can then be observed in the microscope.

Fluorescence microscopes typically use a powerful lighting system to view a specimen that has been treated with a fluorescent stain. The lighting system requires a light source that outputs a high level of light at certain key wavelengths that correlate to peak excitation wavelengths of corresponding fluorescent stains. The light source must be very powerful since the vast majority of the light needs to be filtered to produce a nearly monochromatic, dichromatic, or trichromatic source. Most manufacturers currently use either mercury or xenon light sources, or in some cases, metal halide sources. Recently, manufacturers have also started using light emitting diodes (LEDs).

SUMMARY

Aspects of the subject technology provide a fluorescence module that is configured to provide a selectable light source for fluorescence microscopy, e.g., through the paired selection of a light emitter and a corresponding filter. In some implementations, filter and/or light selection is controlled through the rotation of multiple filters (e.g., filter cubes) and/or light cubes on supporting turrets. Any particular filter cube may be selected by bringing the selected cube into proper alignment with respect to a light pathway.

Various examples of aspects of the subject technology are described as numbered clauses (1, 2, 3, etc.) for convenience. These are provided as examples, and do not limit the subject technology. It is noted that any of the dependent clauses may be combined in any combination, and placed into a respective independent clause. The other clauses can be presented in a similar manner.

1. A fluorescence module configured for providing illumination to a microscope specimen, the fluorescence module comprising:
   a plurality of light sources configured to emit light along a light path; and
   a plurality of light filters configured to receive the light in the light path, wherein the plurality of light filters are configured to be actuated independently from the plurality of light sources.
2. The fluorescence module of clause 1, wherein the plurality of light filters are mounted on a filter turret, and
   wherein rotatable actuation of the filter turret facilitates placement of at least one of the light filters into the light path.
3. The fluorescence module of clause 2, further comprising:
   an optical sensor configured to verify proper rotation of the filter turret for selection of at least one of the light filters.
4. The fluorescence module of clause 1, wherein the plurality of light sources are mounted on a light turret, and
   wherein rotatable actuation of the light turret directs the light path toward at least one of the plurality of light filters.
5. The fluorescence module of clause 1, wherein each of the plurality of light sources are mounted on a light turret, the light turret configured for rotation in a first planar direction; and
   wherein each of the plurality of light filters are mounted on a filter turret, the filter turret configured for rotation in a second planar direction.
6. The fluorescence module of clause 5, wherein the first planar direction is substantially parallel to the second planar direction.
7. The fluorescence module of clause 5, wherein the first planar direction is substantially perpendicular to the second planar direction.
8. The fluorescence module of clause 1, further comprising:
   an optical guide comprising one or more mechanically actuatable mirrors, the optical guide configured for reflecting, using the one or more mechanically actuatable mirrors, the light emitted from at least one of the plurality of light sources and directing the light along the light path.
9. The fluorescence module of clause 1, further comprising:
   a mirror cube for receiving an emission light path originating from the specimen, and
   wherein the mirror cube is configured for directing the emission light path toward one or more of: a charge coupled device (CCD) sensor, or a photodetector, a complementary metal-oxide semiconductor (CMOS) camera, a color camera, or a bayer mosaic camera.
10. The fluorescence module of clause 1, wherein each of the light filters comprises one or more of: an excitation filter, an emission filter, or a dichroic mirror.

11. The fluorescence module of clause 1, wherein each of the plurality of light sources comprises one or more light emitting diodes (LEDs).
12. A method of illuminating a specimen, comprising:
    selecting a light source from among a plurality of light sources, wherein the light source is configured for providing light along a light path via an optical guide; and
    selecting a light filter, from among a plurality of light filters, wherein selection of the light filter comprises actuating the light filter into the light path.
13. The method of clause 12 wherein selecting the light source further comprises:
    rotatably actuating a light turret comprising the plurality of light sources.
14. The method of clause 12, selecting the light source further comprises:
    actuating one or more mirrors in the optical guide to reflect light emitted by the light source into the light path.
15. The method of clause 12, wherein selecting the light filter further comprises:
    rotatably actuating the filter turret using a drive motor; and
    verifying a proper rotation of the filter turret using an optical sensor.
16. The method of clause 12, further comprising:
    receiving, at a mirror cube, an emission light path originating from the specimen; and
    directing, using the mirror cube, the emission light path toward one or more of: a charge coupled device (CCD) sensor, or a photodetector, a complementary metal-oxide semiconductor (CMOS) camera, a color camera, or a bayer mosaic camera.
17. The method of clause 12, wherein the optical guide comprises one or more mechanically actuatable reflective surfaces for directing light emitted from at least one of the plurality of light sources along the light path.
18. The method of clause 12, wherein each of the filters comprises one or more of: an excitation filter, an emission filter, or a dichoric mirror.
19. A method for assembling a fluorescence module, comprising:
    mounting a plurality of light sources adjacent to an optical guide, wherein the optical guide is configured for receiving light emitted from at least one of the plurality of light sources and directing the light along a light path; and
    mounting a plurality of light filters on a filter turret, wherein rotatable actuation of the filter turret places at least one of the light filters into a position for receiving the light from the optical guide.
20. A fluorescence module comprising:
    a plurality of light sources adjacently disposed to an optical guide, wherein the optical guide is configured for receiving light emitted from at least one of the plurality of light sources and directing the light along a light path; and
    a filter carriage comprising a plurality of light filters, wherein linear actuation of the filter carriage on a linear track places at least one of the light filters into a position for receiving the light from the optical guide.

It is understood that other configurations of the subject technology will become readily apparent to those skilled in the art from the following detailed description, wherein various configurations of the technology are shown and described by way of illustration. The disclosed technology is capable of other and different configurations and its several details are capable of modification in various respects without departing from the scope of the subject technology. Accordingly, the detailed description and drawings are to be regarded as illustrative and not restrictive in nature.

BRIEF DESCRIPTION OF THE DRAWINGS

Certain features of the subject technology are set forth in the appended drawings. However, the accompanying drawings, which are included to provide further understanding, illustrate disclosed aspects and together with the description serve to explain the principles of the subject technology. In the drawings:

FIG. 3A illustrates a front and side view of an example of a substantially perpendicular arrangement of a filter turret and a light turret.

DETAILED DESCRIPTION

The detailed description set forth below is intended as a description of various configurations of the subject technology and is not intended to represent the only configurations in which the subject technology can be practiced. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring concepts of the subject technology.

Generation of luminescence through excitation of a molecule by ultraviolet or visible light is a phenomenon termed photoluminescence, which is formally divided into two categories: (1) fluorescence; and (2) phosphorescence, depending upon the configuration of the excited state and the emission pathway. Fluorescence is the property of some atoms and molecules to absorb light at a particular wavelength and to subsequently emit light of a longer wavelength after a brief interval, i.e., fluorescence lifetime. The process of phosphorescence occurs in a manner similar to fluorescence, but with a much longer excited state lifetime.

The general function of a fluorescence microscope is to permit excitation light to irradiate a specimen and separate less intense re-radiating fluorescent light from brighter excitation light. Thus, only emission light reaches the eye or other light detectors. The resulting fluorescing areas shine against a dark background with sufficient contrast to permit detection. In some implementations, the darker the background of the non-fluorescing material, the more efficient the instrument.

Aspects of the subject technology relate to a fluorescence module that can be used to irradiate a specimen using a selectable light source. Although various light sources may be used (depending on the desired configuration), in one example light emitting diodes (LEDs) are used to provide light at a specific wavelength or color. One or more LEDs can be physically packaged into discrete units ("light sources" or "light cubes") used to provide incident light for specimen irradiation. When implemented, light emitted from a respective light cube (corresponding with a specific color), can be directed to a corresponding exciter filter, before being provided onto the specimen. In some aspects, each exciter filter is associated with different light wavelengths (i.e., a different light cube), and configured to provide filtration of the light transmitted onto the specimen. As discussed in further detail below, the selection/pairing of a particular light cube/filter cube set can be controlled using mechanical actuation of one or more mirrors, as well as the corresponding actuation of filter cubes and/or light cubes.

Figure 1:
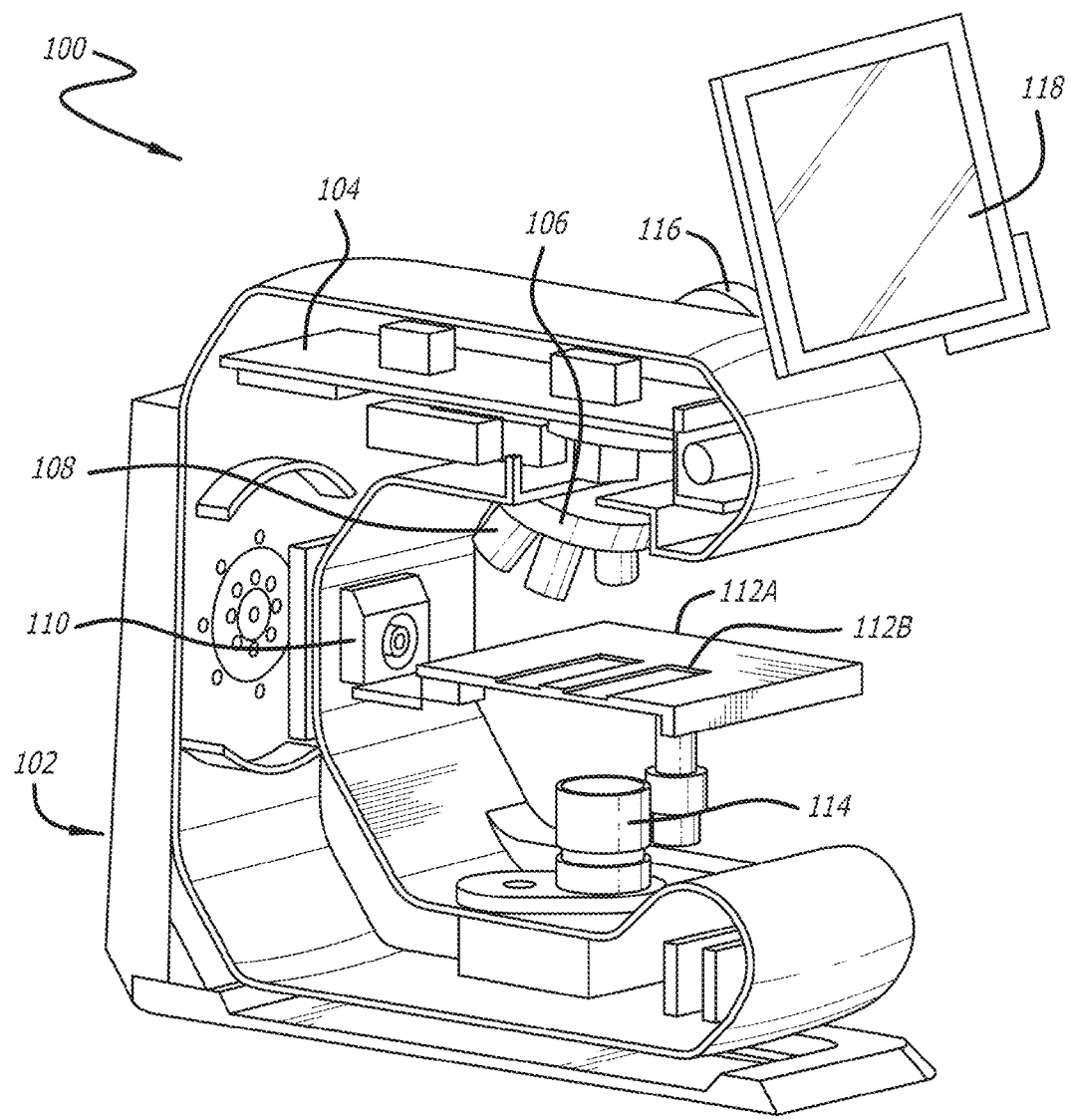
FIG. 1 illustrates an example of a reconfigurable (i.e., invertible) microscope, including a fluorescence module, according to some aspects of the subject technology.

FIG. 1 illustrates an example of a reconfigurable (i.e., invertible) microscope 100 including a fluorescence module 104, as implemented in some aspects of the technology. Reconfigurable microscope 100 includes a base (stand) 102, nose piece 106, objective lens 108, stage quick release 110, a stage 112A, specimen insert 112B, condenser 114, optical arm 116, and display cradle 118.

The optical components of reconfigurable microscope 100 (including fluorescence module 104) are configured to be rotated between an upright position and an inverted position, e.g., about base 102. In operation, fluorescence module 104 is configured to provide incident light of different wavelengths onto a specimen (not shown) via a light path of "excitation light" (e.g., an excitation light path). As discussed in further detail below, in some aspects the excitation light path begins at one or more light cubes (see FIG. 2A), and is directed by an optical guide to one of a plurality of filter cubes that are selectable/addressable on a rotating turret (e.g., a filter turret).

Figure 2A:
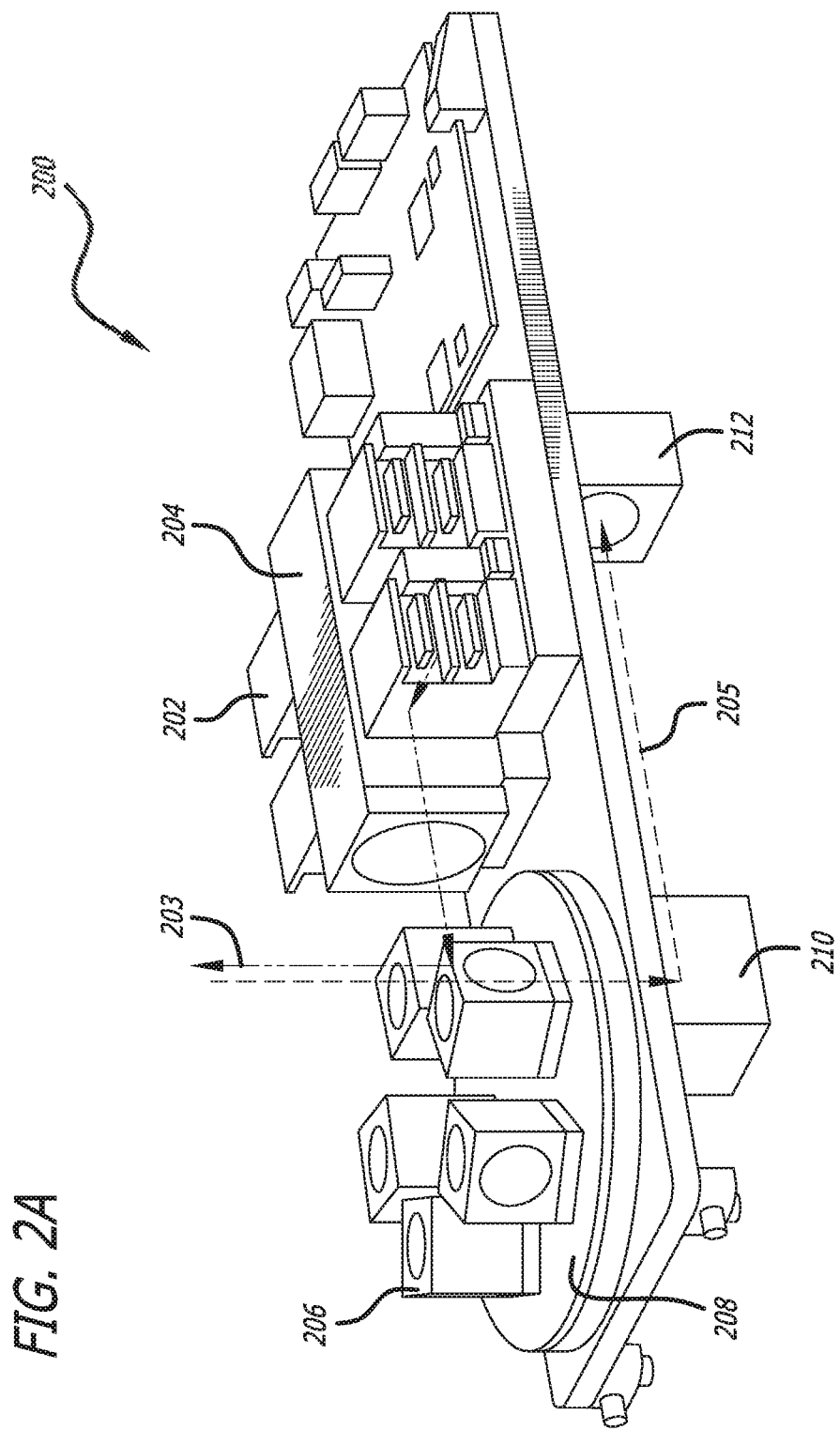
FIG. 2A illustrates a perspective view of an example fluorescence module.

FIG. 2A illustrates a perspective view of fluorescence module 200, identifying excitation light path 203 and emission light path 205. As illustrated, fluorescence module 200 includes light cubes 202, optical guide 204, filter cubes 206, filter turret 208, mirror cube 210, and a camera 212.

Light cubes 202 may contain one or more light emitting elements or light sources, such as one or more light emitting diodes (LEDs), for emitting light at different wavelengths or colors. Optical guide 204 may also contain one or more reflective surfaces, (e.g., mirrors) or other optical reflective surfaces for directing the excitation light from the selected light source to the optical guide 204 and toward a selected filter cube 206.

Figure 2B:
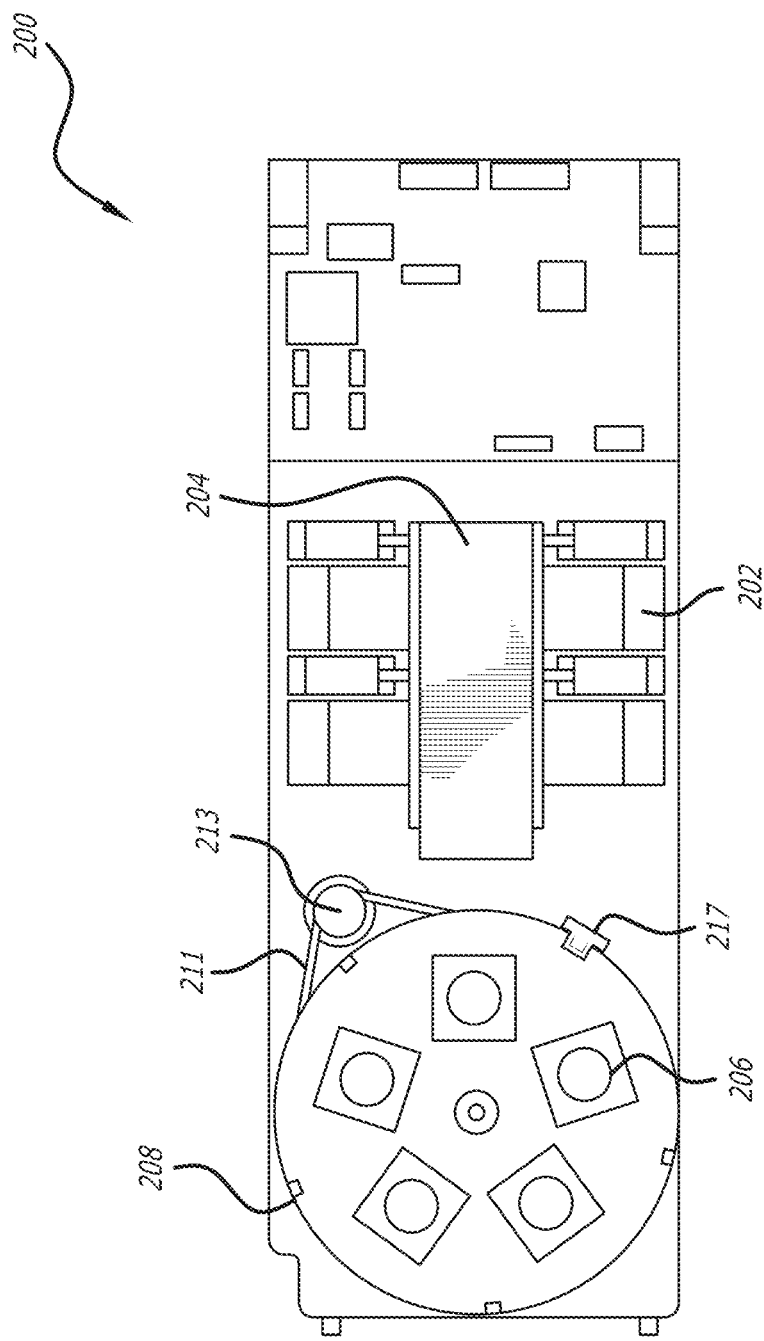
FIG. 2B illustrates an example top view of a fluorescence module.
Figure 2C:
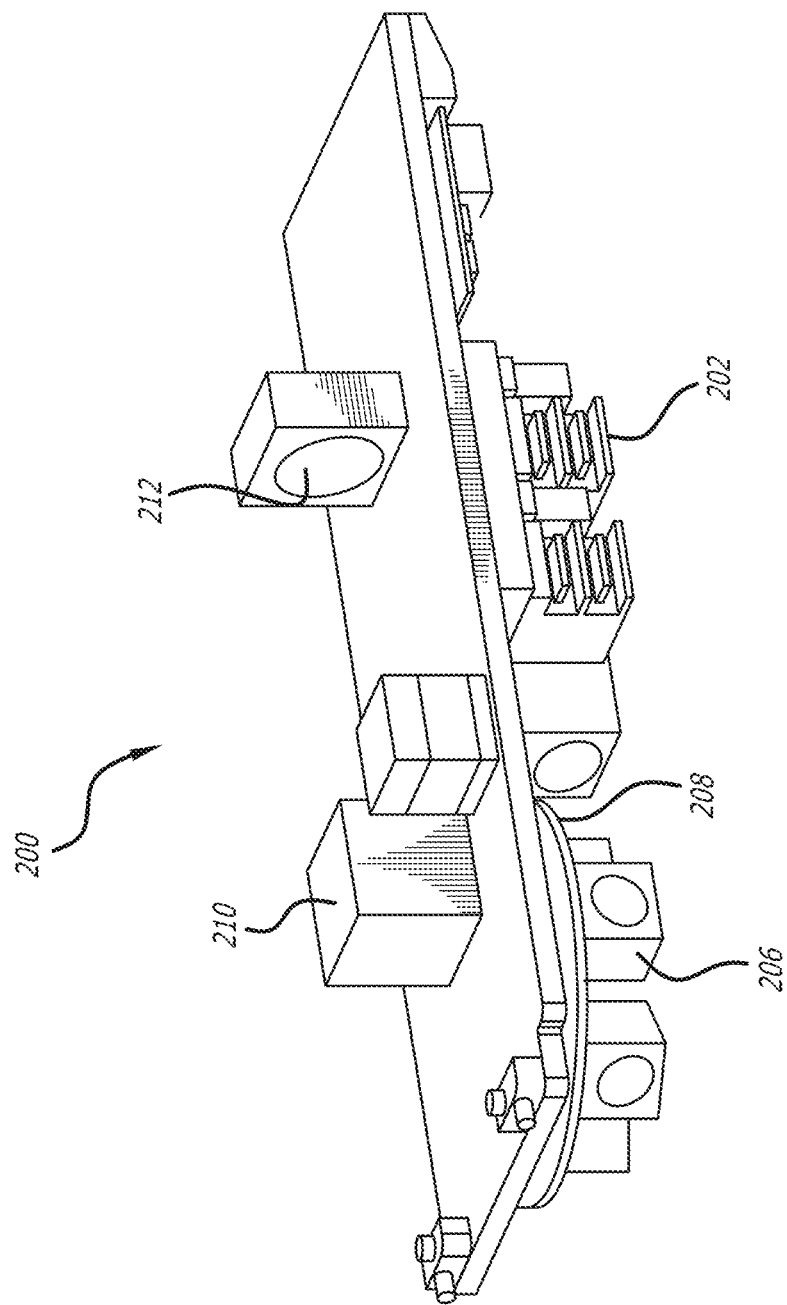
FIG. 2C illustrates another example perspective view of a fluorescence module.
Figure 2D:
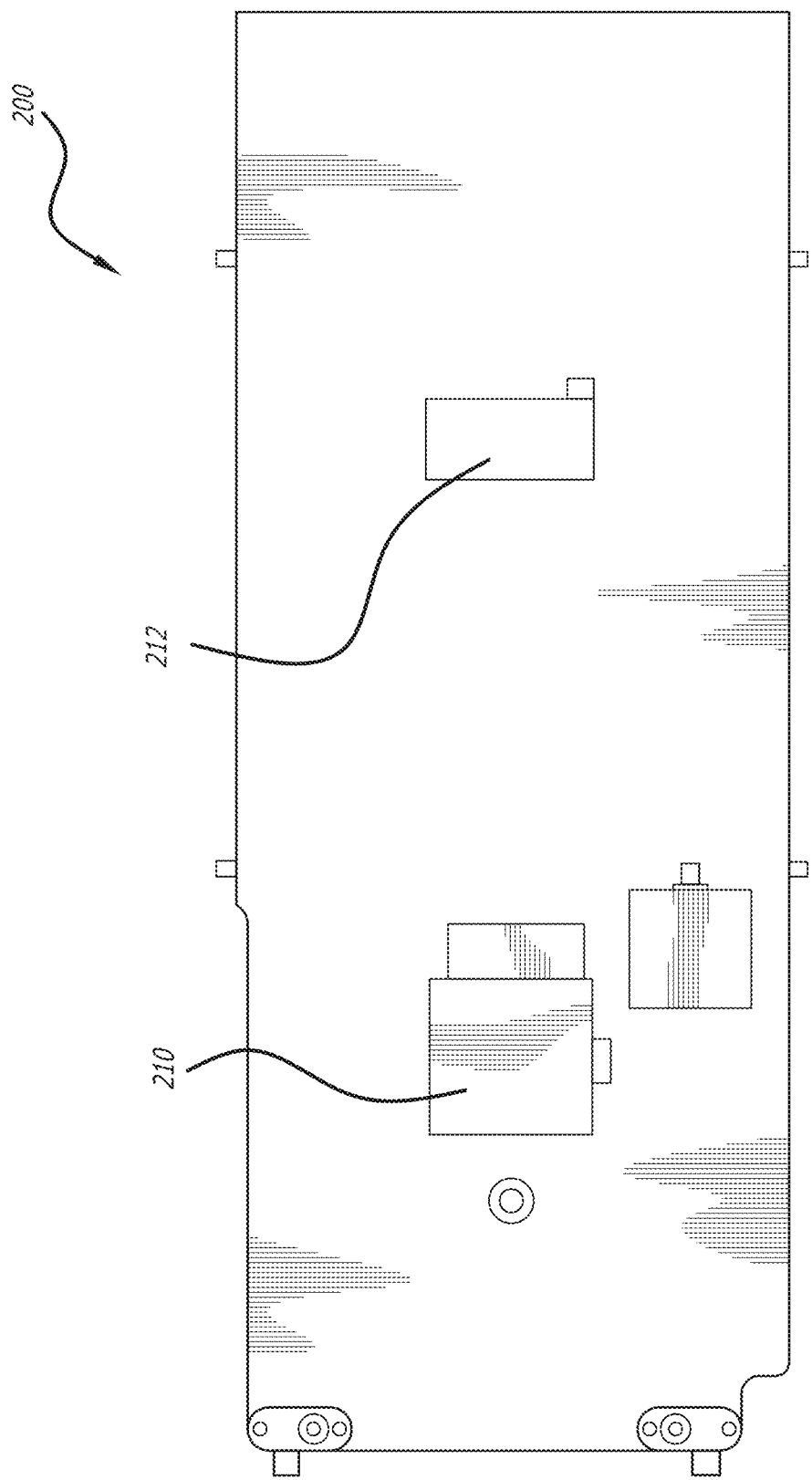
FIG. 2D illustrates an example bottom perspective view of a fluorescence module.
Figure 2E:
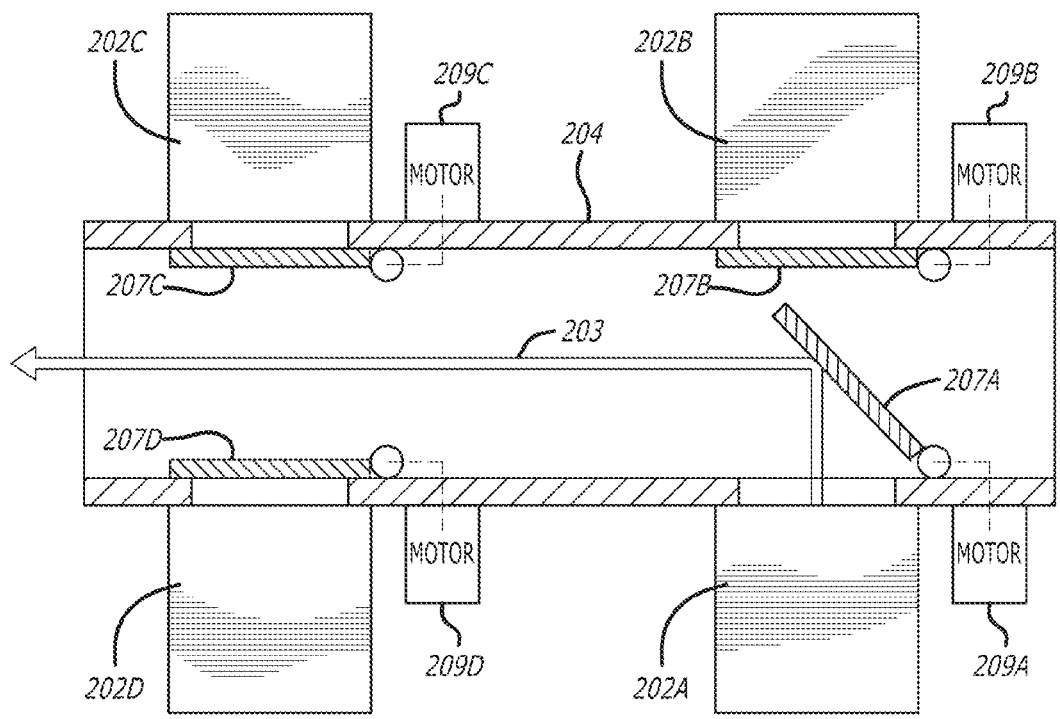
FIG. 2E illustrates an example cut-away top view of an optical guide.
Figure 2F:
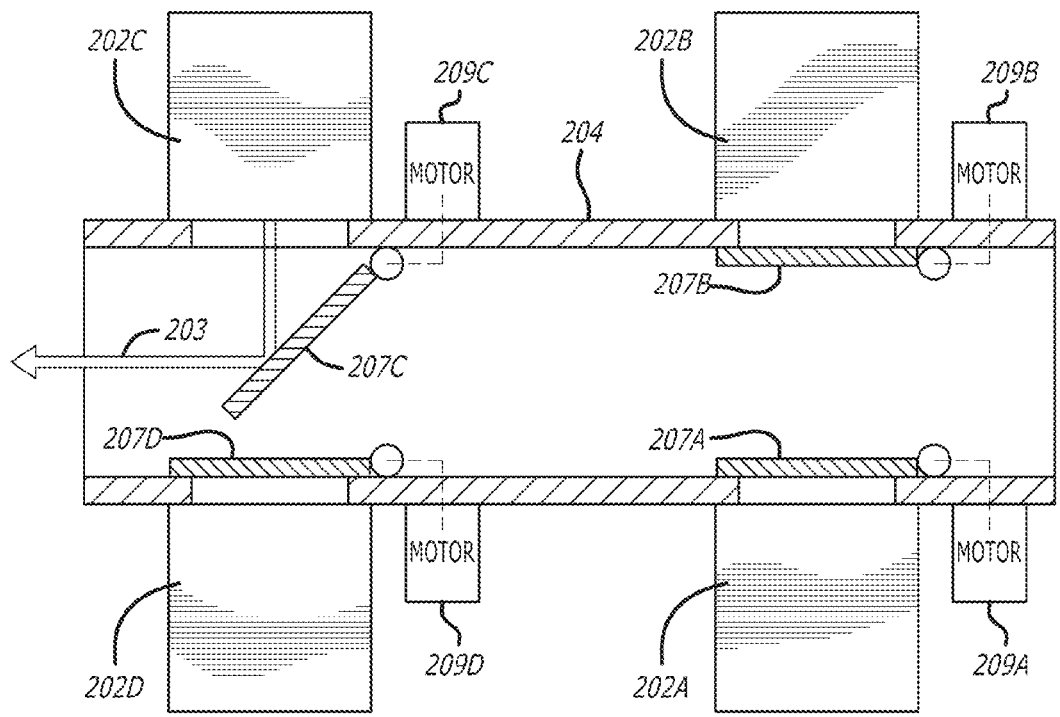
FIG. 2F illustrates another example cut-away top view of an optical guide.
Figure 2G:
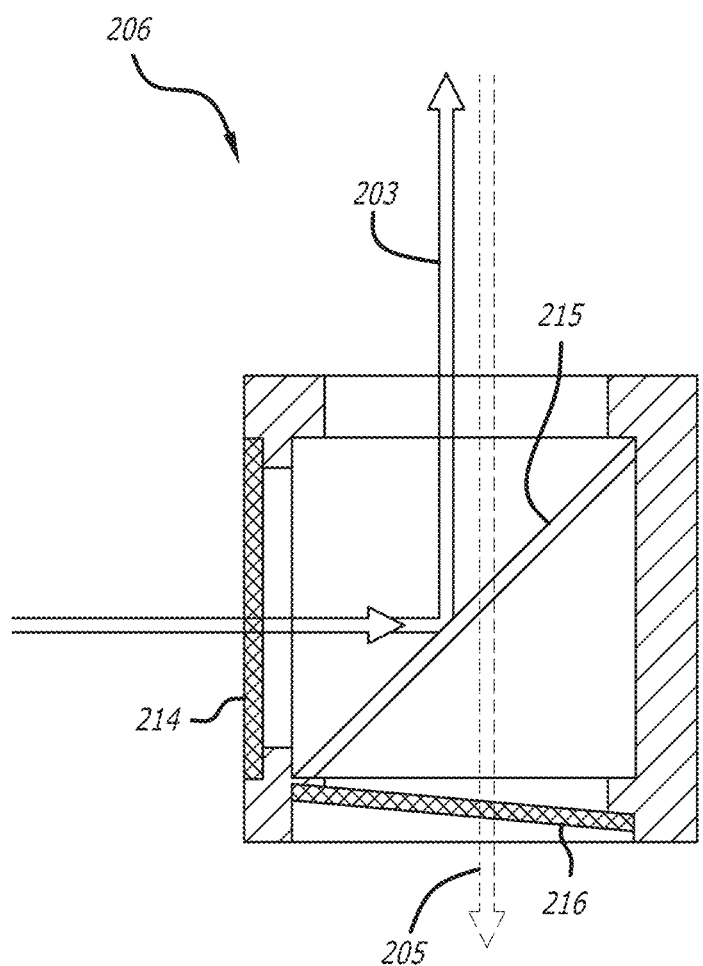
FIG. 2G illustrates an example cut-away view of a filter cube.

Referring to FIG. 2G, each of filter cubes 206 may include an excitation filter 214, a dichroic mirror 215, and an emission filter 216. However, other filter cube configurations are possible without departing from the scope of the invention. As understood by those of skill in the art, an excitation filter (e.g., excitation filter 214) can be a bandpass filter that passes only the wavelengths absorbed by a specimen administered fluorophore, thus minimizing excitation of other sources of fluorescence and blocking excitation light in the fluorescence emission band. The dichroic mirror 215 can be configured to function as an edge filter used at an oblique angle of incidence (for example 45°) to reflect light in the excitation band and to transmit light in the emission band. The emission filter 216 can include a bandpass filter, for example, that passes wavelengths emitted by the fluorophore and blocks undesired light. By blocking unwanted excitation energy, including ultraviolet (UV) and infra-red (IR), or sample and system autofluorescence, optical filters ensure the darkest background.

In some aspects, filter cubes with narrower passbands may be preferred when imaging a sample labeled with multiple fluorophores. For example, narrower passbands can help to reduce crosstalk by allowing only the strongest portion of the fluorophore emission spectrum to be transmitted, thus reducing autofluorescence noise and improving the signal-to-noise ratio in high background autofluorescence samples. Such filter sets can be preferential for samples with ample fluorescent signal level.

As discussed in further detail below with respect to FIGS. 2E and 2F, selection of a particular light cube 202 may be accomplished, for example, by mechanically actuating one or more mirrors in optical guide 204 to reflect light emitted by the selected light cube 202 toward a selected filter cube 206. Referring to FIGS. 2E and 2F, a series of mirrors 207A-D may be positioned within the optical guide 204 and aligned such that when actuated into an active or reflecting position, light emitted by a selected light cube 202A-D is reflected and directed towards a corresponding one of filter cubes 206. Each mirror 207A-D may be pivotably mounted to the housing of optical guide 202 and configured to be actuated between the active position (light reflecting position) and a passive position (away from the optical path in the optical guide 204). Actuation of each mirror may be accomplished by mechanical movement of the mirror via a linear or rotating actuator.

Referring to FIG. 2A, in operation, filter cubes 206 are mounted on filter turret 208 and are configured to rotate as filter turret 208 is rotatably actuated. Notably, filter cubes 206 and light cubes 202 are not housed within the same housing, rather they are mounted on different components thereby allowing filter cubes 206 to independently rotate with respect to light cubes 202. In other words, filter cubes 206 and light cubes 202 may be independently actuated.

As illustrated in FIG. 2A, excitation light path 203, originating at one of light cubes 202, is directed to a selected one of filter cubes 206 via optical guide 204. Light received by the corresponding filter cube is first received by an excitation filter 214 for selecting an excitation wavelength of light from the light cube 202. The light is then directed onto a specimen (not illustrated) via a dichroic mirror 215 (see FIG. 2G) which reflects light from the light cube 202 to illuminate the specimen. The light is re-radiated from the specimen (e.g., emission light path 205) to the selected filter cube 206. An emission filter 216 is adapted to transmit fluorescence from the specimen and block any reflected excitation light. The light is then passed through to mirror cube 210 before being provided to a camera 212 (e.g., such as a monochrome CCD camera).

To select a different light cube 202 (e.g., light source having a different color/wavelength), the optical guide 204 may be reconfigured by actuating an appropriate mirror (see FIG. 2E-F, mirrors 207A-D) to select the desired light cube 202. Light emitted from newly selected light cube 202 may then be directed to filter cube 206 via optical guide 204. To select a different filter cube 206, the filter turret 208 may be rotated. In this manner, selection of different light sources and filters may be performed to permit fluorescence microscopy with reconfigurable microscope 100.

FIG. 2B illustrates an example top view of fluorescence module 200, in which a top surface of light cubes 202, optical guide 204, filter cubes 206, optical encoders 217, and filter turret 208, are visible.

Filter turret 208 can be mechanically rotated using belt 211 and drive motor 213, wherein optical encoders 217 (e.g., one or more optical sensors) are configured for selecting/verifying a position of filter turret 208. It is understood that turret rotation and/or position verification may be performed using any means of rotating filter turret 208 or addressing the turret position, without departing from the scope of the invention.

The examples of FIGS. 2A and 2B illustrate configurations with four light cubes 202 and five filter cubes 206; however, it is understood that other configurations are possible. For example, a greater (or fewer) number of light cubes 202 and/or filter cubes 206 may be implemented, without departing from the scope of the invention.

FIG. 2C illustrates another perspective view of a fluorescence module (e.g., fluorescence module 200). In the illustrated view, mirror cube 210 and camera 212 are illustrated. In this example, light cubes 202, filter cubes 206 and turret 208 are also illustrated on a bottom surface of fluorescence module 200. In practice, emission light from a specimen (not illustrated) is received at the mirror cube 210 and transmitted to camera 212 for detection and image processing. Although camera 212 can be implemented using various optical sensing devices, such as a charge coupled device (CCD), in some implementations camera 212 may be a monochromatic camera. In other implementations, camera 212 may be any device capable of registering an optical signal, including but not limited to: a complementary metal-oxide semiconductor (CMOS) camera, a color camera, and/or a bayer mosaic camera, etc.

FIG. 2D illustrates another example perspective view of a fluorescence module (e.g. fluorescence module 200). In the illustration of FIG. 2D a mirror cube 210 and camera 212 arrangement are illustrated. As noted above, camera 212 can include (or be replaced by) various types of optical sensing devices, depending on the desired implementation. By way of example, camera 212 may be configured to detect low intensity signals on the return emission light path, for which additional image processing can be performed to generate an image of an irradiated specimen.

FIG. 2E illustrates an example cut-away perspective view of optical guide 204, as discussed above with respect to FIG. 2B. Optical guide 204 includes mirrors 207 (e.g., mirrors 207A-D), that are positioned adjacent to light cubes 202 (e.g., light sources 202A-202D). In the illustrated example, motors 209 (e.g., motors 209A-D) are configured to actuate corresponding mirrors 207, for example, about an associated pivot point. In practice, optical guide 204 is configured to reflect light received by light cubes 202 into excitation light path 203, which is provided to a selected filter (e.g., one of filter cubes 206), as discussed above.

In the example of FIG. 2E, mirror 207A is positioned for reflecting light emitted by corresponding light 202A (e.g., into excitation light path 203). In the illustrated configuration, mirrors 207B, 207C and 207D are not used for reflecting light emitted by their corresponding light sources. Each of mirrors 207A-D may be mechanically actuated by using one or more electrical motors (e.g., motors 209).

FIG. 2F illustrates another cut-away perspective view of optical guide 204, for example, in which light emitted by light 202C is reflected into excitation light path by mirror 207C. As discussed above, each of light cubes 202A-D can include a light emission source (such as an LED), that is configured for emitting light at a different wavelength and/or color.

It is understood that other mechanical systems, including various well known linkage and gearing systems, may be implemented for actuating one or more of mirrors 207. For example, belt and/or gear driven systems may be used for actuating a mirror using one or more mechanical motors (e.g., motors 209) located inside (or outside) optical guide 204. Additionally, it is understood that optical guide 204 can include a greater (or fewer) number of mirrors 207 for reflecting light emitted by a greater (or fewer) number of light cubes 202.

In the example described above, selection of filter cubes 206 is accomplished by rotating filter turret 208. There are, however, other methods for selecting filter cubes 206. For example, in other aspects, selection of a filter cube 206 may be performed by mounting filter cubes 206 on a rail (e.g., a linear rail). In such an arrangement, selection of a desired filter cube 206 may be accomplished by addressing/biasing/moving/sliding the filter cubes 206 along the rail until the desired filter cube 206 is positioned into the excitation light path 203. In this example, the filter cubes 206 may be mounted on a sliding rail that is actuated by a linear actuator or a rotating actuator in combination with well-known linkage and gearing arrangements. As discussed above, mirrors within optical guide 204 may be actuated to reflect light emitted from a selected or desired light cube 202 to thereby cause the emitted light from the selected light source to be directed towards a selected or desired filter cube 206.

The foregoing examples illustrate methods of providing fluorescent illumination to a specimen by selecting a stationary light source (e.g., one of light cubes 202), and providing an excitation light path 203 to an actuatable filter. However, other embodiments are contemplated without departing from the scope of the subject technology. For example, independent actuation of one or more light sources and/or filters may be used for viewing a specimen with a fluorescence microscope. By way of example, FIG. 3A illustrates an example embodiment in which light cubes may be actuated, in addition to, but independently from, actuation of one or more filter cubes.

In particular, FIG. 3A illustrates an example of an actuatable filter turret 304 that is substantially perpendicular to an actuatable light turret 308. In the example of FIG. 3A one or more filter cubes 302 are disposed on a surface of filter turret 304, in which actuation of filter turret 304 causes a corresponding rotation of filter cubes 302, e.g., in the rotational plane of filter turret 304. Likewise, one or more light cubes 306 are disposed on a surface of light turret 308, in which actuation of light turret 308 causes a corresponding rotation of light cubes 306, e.g., in the rotational plane of light turret 308. Actuation of filter turret 304 and/or light turret 308 can be accomplished with a drive motor (not illustrated), for example, using either a gear or belt drive system.

In practice, excitation light path 303 can be directed to a specimen 312 on stage 310 through selection of a desired light cube/filter cube combination. Light is re-radiated from the specimen 312, via emission light path 305, to the selected filter cube 302. Light and filter cube selection can be accomplished via rotation of both filter turret 304 and/or light turret 308 such that light emitted by a desired light cube is provided to the corresponding selected filter cube 302. It is understood that other orientations of filter turret 304 and/or light turret 308 may be implemented, without departing from the scope of the invention.

Figure 3B:
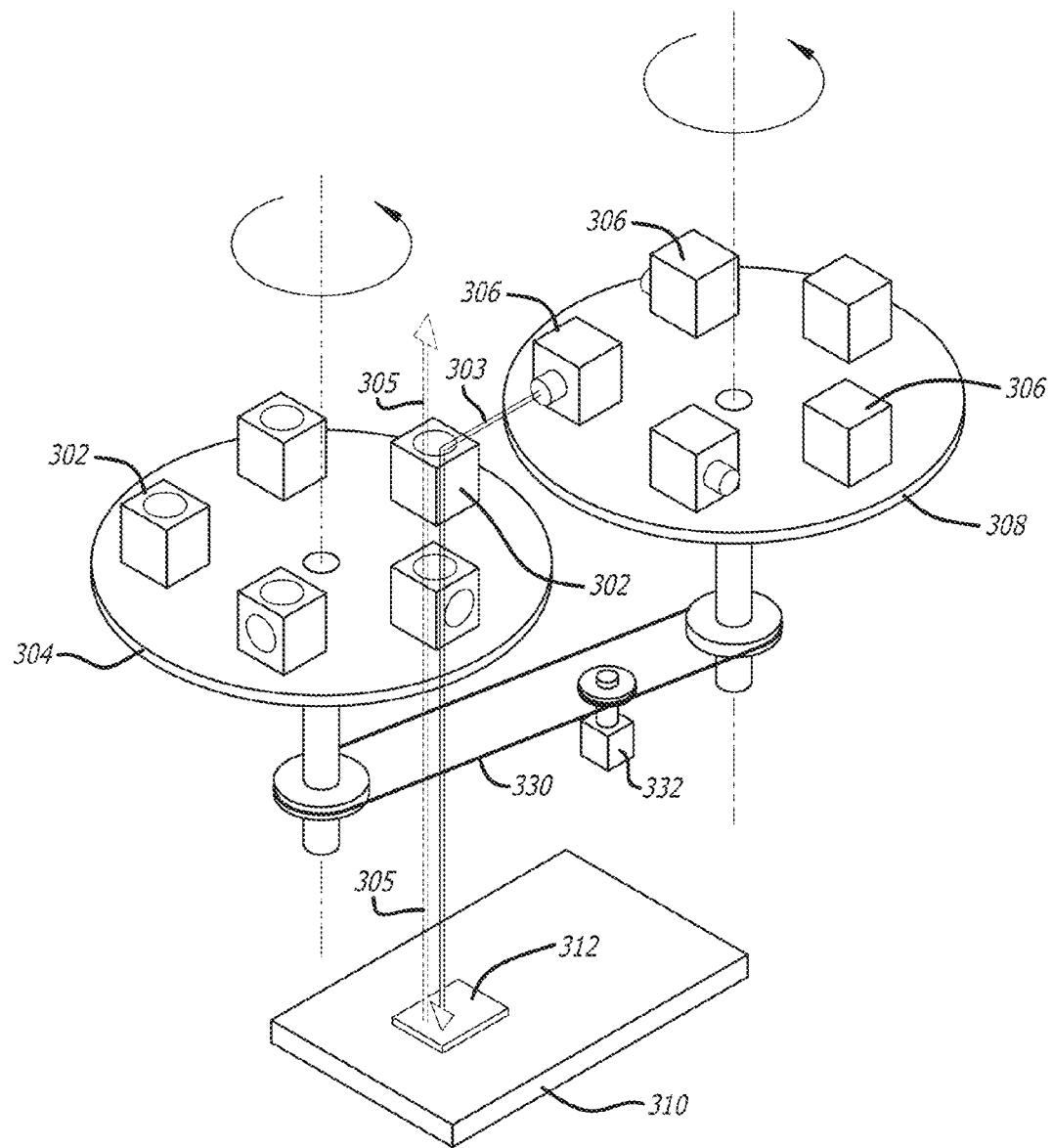
FIG. 3B illustrates an example of a substantially parallel arrangement of a filter turret and a light turret.

FIG. 3B illustrates an example of a substantially parallel arrangement of filter turret 304 and light turret 308. In the example of FIG. 3B, filter turret 304 and light turret 308 are disposed in a substantially parallel orientation, such that actuation of filter turret 304 causes rotation of filter cubes 302 in a rotational plane that is substantially parallel to the rotational plane of light turret 308. Similar to the example of FIG. 3A, excitation light path 303 can be provided to specimen 312 (on stage 310) and is re-radiated, from the specimen 312, via emission light path 305 to the selected filter cube 302 when a selected light cube/filter cube combination are brought into optical alignment.

As shown in FIG. 3B, the filter turret 304 and light turret 308 may be belt driven (e.g., using a motor 332 and belt 330) and/or otherwise coupled so that actuation of one turret causes actuation of the other turret. Alternatively, filter turret 304 and light turret 308 may be coupled together and actuated via a gearing arrangement. In one aspect, selection of a particular light source may result in selection of a corresponding filter.

Figure 3C:
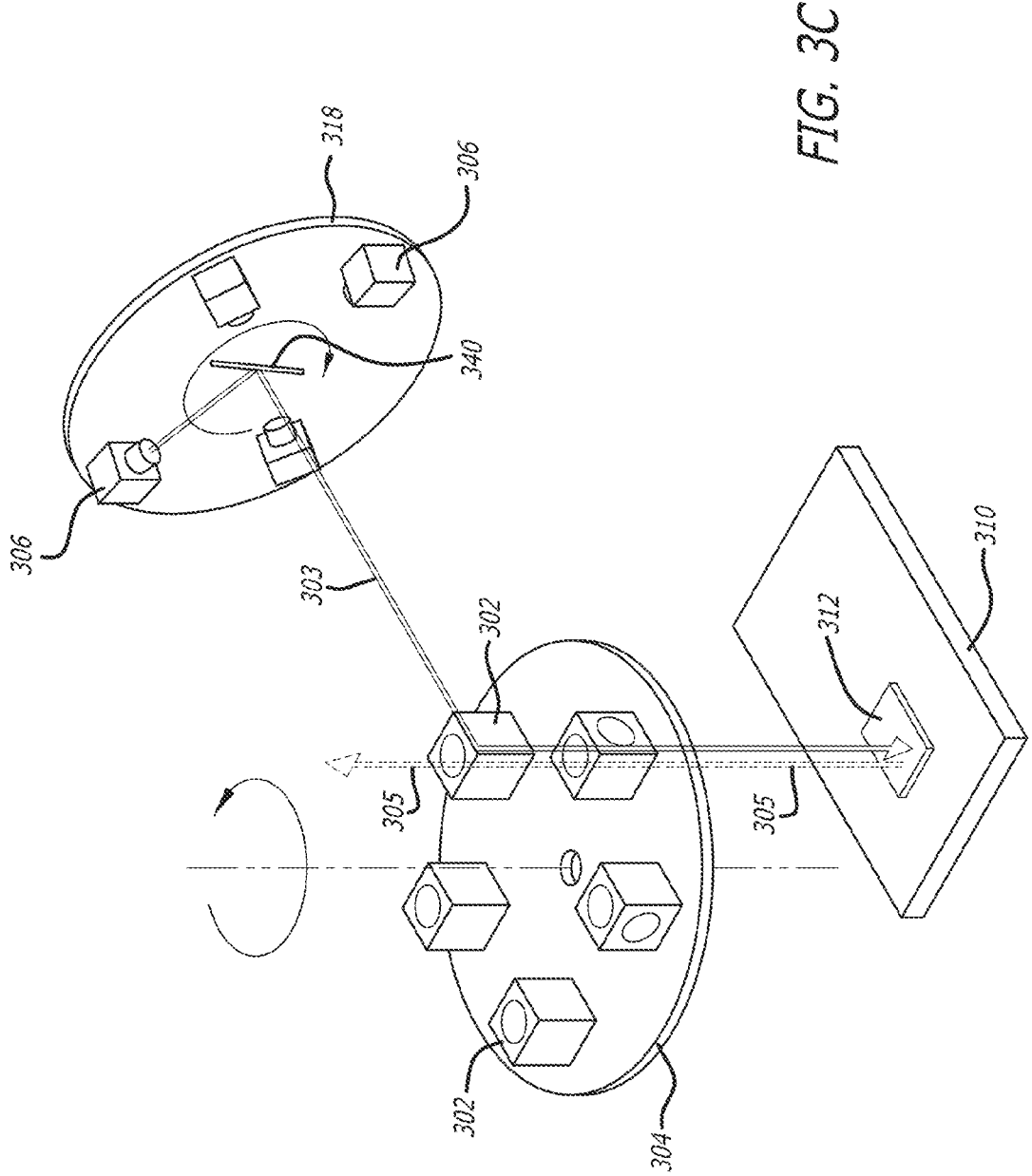
FIG. 3C illustrates an example of a rotating mirror configuration, according to some aspects of the technology.

FIG. 3C illustrates an example of a rotating mirror configuration, in which a rotating mirror 340 is used in conjunction with a (stationary) light turret 318 to select a desired light cube 306 for providing light to specimen 312. In this example, rotating mirror 340 is disposed in the center of a stationary light turret 318, which includes light cubes 306 disposed radially on an outer edge of light turret 318. In this arrangement, light cubes 306 are positioned to emit light toward the center of light turret 318, e.g., to the rotating mirror 340. Upon selection of a desired light source, the selected light cube 306 emits light and rotating mirror 340 is actuated to reflect the emitted light toward a selected filter cube 302 on filter turret 304. The light is re-radiated from the specimen 312 via emission light path 305 to the selected filter cube 302.

In some aspects, light source selection can also correspond with a rotation of filter turret 304, for example, to move a respectively selected filter cube 302 into position for receiving excitation light (e.g., via excitation light path 303) from the selected light cube 306. Upon selection of another light source, a different light cube 306 emits light and the rotating mirror 320 rotates so that the light emitted from newly selected light cube 306 is reflected toward the appropriate filter cube 302. Selection of the appropriate filter cube 302 and/or actuation of rotating mirror 340 can be accomplished using mechanical actuation means, as described above.

Although the example of FIG. 3C, illustrates light turret 318 and filter turret 304 disposed in a substantially perpendicular orientation, other configurations are possible, without departing from the scope of the subject technology. For example, light turret 318 and filter turret 304 may be substantially parallel, similar to the configurations discussed with respect to FIG. 3B, above.

It is understood that the rotational position of filter turret 304 and/or light turret 308 can be verified using a position detector, such as a closed loop feedback device. Position detection and variation can include implementations utilizing magnets, lasers and/or photo-receptors, such as optical encoders 217, as discussed above with respect to FIGS. 2A and 2B.

The description of the subject technology is provided to enable any person skilled in the art to practice the various embodiments described herein. While the subject technology has been particularly described with reference to the various figures and embodiments, it should be understood that these are for illustration purposes only and should not be taken as limiting the scope of the subject technology.

There may be many other ways to implement the subject technology. Various functions and elements described herein may be partitioned differently from those shown without departing from the scope of the subject technology. Various modifications to these embodiments will be readily apparent to those skilled in the art, and generic principles defined herein may be applied to other embodiments. Thus, many changes and modifications may be made to the subject technology, by one having ordinary skill in the art, without departing from the scope of the subject technology.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. All structural and functional equivalents to the elements of the various embodiments described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

It is understood that any specific order or hierarchy of steps in the processes disclosed is an illustration of exemplary approaches. Based upon design preferences, it is understood that the specific order or hierarchy of steps in the processes may be rearranged, or that only a portion of the illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more."

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

What is claimed is:

1. A fluorescence module configured for providing illumination to a microscope specimen, the fluorescence module comprising:
   a plurality of light sources mounted on a light turret and configured to emit light along a light path; and
   a plurality of light filters configured to receive the light in the light path, wherein the plurality of light filters are configured to be actuated independently from the plurality of light sources, and wherein rotatable actuation of the light turret directs the light path toward at least one of the plurality of light filters.

2. The fluorescence module of claim 1, wherein the plurality of light filters are mounted on a filter turret, and
   wherein rotatable actuation of the filter turret facilitates placement of at least one of the light filters into the light path.

3. The fluorescence module of claim 2, further comprising:
   an optical sensor configured to verify proper rotation of the filter turret for selection of at least one of the light filters.

4. fluorescence module of claim 1, further comprising:
   an optical guide comprising one or more mechanically actuatable mirrors, the optical guide configured for reflecting, using the one or more mechanically actuatable mirrors, the light emitted from at least one of the plurality of light sources and directing the light along the light path.

5. The fluorescence module of claim 1, further comprising:
   a mirror cube for receiving an emission light path originating from the specimen, and
   wherein the mirror cube is configured for directing the emission light path toward one or more of: a charge coupled device (CCD) sensor, or a photodetector, a complementary metal-oxide semiconductor (CMOS) camera, a color camera, or a bayer mosaic camera.

6. The fluorescence module of claim 1, wherein each of the light filters comprises one or more of: an excitation filter, an emission filter, or a dichoric mirror.

7. The fluorescence module of claim 1, wherein each of the plurality of light sources comprises one or more light emitting diodes (LEDs).

8. A fluorescence module configured for providing illumination to a microscope specimen, the fluorescence module comprising:
   a plurality of light sources configured to emit light along a light path, wherein each of the plurality of light sources are mounted on a light turret, the light turret configured for rotation in a first planar direction; and
   a plurality of light filters configured to receive the light in the light path, wherein the plurality of light filters are configured to be actuated independently from the plurality of light sources, and wherein each of the plurality of light filters are mounted on a filter turret, the filter turret configured for rotation in a second planar direction.

9. The fluorescence module of claim 8, wherein the first planar direction is substantially parallel to the second planar direction.

10. The fluorescence module of claim 8, wherein the first planar direction is substantially perpendicular to the second planar direction.

* * * * *